United States Patent
Li

(10) Patent No.: US 6,263,992 B1
(45) Date of Patent: Jul. 24, 2001

(54) TORQUE DETECTION DEVICE

(76) Inventor: Shu-Shian Li, Fl. 5, No. 21, Lane 16, Sec. 2, Chungshang N. Road, Taipei (TW)

( * ) Notice: Subject to any disclaimer, the term of this patent is extended or adjusted under 35 U.S.C. 154(b) by 0 days.

(21) Appl. No.: 09/375,496

(22) Filed: Aug. 17, 1999

(51) Int. Cl.$^7$ ....................................................... B62M 1/02
(52) U.S. Cl. ..................... 180/206; 73/862.331; 280/259
(58) Field of Search ................................... 180/205, 206, 180/207, 220; 73/847, 862.191, 862.193, 862.321, 862.331, 862.332, 862.333, 862.334, 862.335; 280/259, 260, 261

(56) References Cited

U.S. PATENT DOCUMENTS

| | | | |
|---|---|---|---|
| 5,816,599 | * 10/1998 | Soejima et al. | 280/259 |
| 5,831,180 | * 11/1998 | Tanaka et al. | 73/862.333 |
| 5,900,703 | 5/1999 | Li . | |
| 5,937,962 | * 8/1999 | Yokoyama | 180/205 |
| 5,984,038 | * 11/1999 | Fujiwara et al. | 180/206 |
| 6,138,520 | * 10/2000 | Chang | 73/862.193 |

FOREIGN PATENT DOCUMENTS

| | | | |
|---|---|---|---|
| 168905 | * 1/1986 | (EP) | 180/206 |
| 84215538 | 7/2000 | (TW) . | |

* cited by examiner

*Primary Examiner*—Paul N. Dickson
*Assistant Examiner*—Avraham H. Lerner
(74) *Attorney, Agent, or Firm*—Bacon & Thomas, PLLC

(57) ABSTRACT

A torque detection device for detecting a torque applied to a bicycle for controlling power output of a motor applied to the bicycle in helping moving the bicycle is disclosed. The torque detection device includes a shaft coupled to a driving chain wheel and pedals of the bicycle. A circuit including strain gauge based elements is embedded in the shaft for converting a torsional deformation caused by the torque applied to the shaft by a rider via the pedals into an electrical signal. The electrical signal, after being properly processed, is applied to a motor power controller which in turns controls the power output of the motor whereby the torque from the motor is determined based on the torque applied by the rider to the bicycle. Thus, as the rider applies a great torque to the pedals, the motor correspondingly supplies a large output of power to the bicycle for helping moving the bicycle. No additional manual control of the motor is needed.

18 Claims, 9 Drawing Sheets

TORQUE DETECTION DEVICE

FIELD OF THE INVENTION

The present invention generally relates to a torque detection device for a motor assisted bicycle, and in particular to a device for detection of the torque applied to a bicycle by a rider for controlling the torque output of a motor for assisting moving the bicycle in a controlled manner.

BACKGROUND OF THE INVENTION

In the trend of environmental protection, bicycles are widely used as personal transportation means. To help bicycle riders in difficult situations, such as moving uphill, an electrical motor may be mounted to the bicycle to generate additional torque to the bicycle wheels. The motor is usually powered by a battery set which has a limited power supply. Thus, the power of the battery set must be conserved and consumed in an efficient way. A manual control may be mounted in the frame and operated by the rider in order to selectively turn on/off the motor. The manual control cannot responds automatically to different riding situations by changing power output of the motor and thus may cause waste of the power of the battery set. Furthermore, manually controlling the motor while watching the traffic condition may be difficult for some riders and accidents may result therefrom.

Taiwan Patent Application No. 84215538 discloses a device for controlling the motor of the bicycle. Such a device is in general ineffective in controlling the motor. U.S. Pat. No. 5,900,703 also discloses a device to control the motor. The device cannot control the output power of the motor and thus may still cause waste of power.

Thus, it is desired to provide a torque detection device that allows a motor of a power-assisted bicycle to be controlled based on torque applied by a rider to the bicycle for overcoming the above problems.

SUMMARY OF THE INVENTION

Accordingly, an object of the present invention is to provide a torque detection device for detecting torque applied to a bicycle by a rider and generating a signal corresponding to the torque for controlling power output of a motor of the bicycle whereby the power output of the motor is determined based on the torque applied by the rider for efficient use of power of a battery set of the bicycle.

Another object of the present invention is to provide a device which automatically controls power output of a motor of a power-assisted bicycle for eliminating manual control of the motor.

To achieve the above object, in accordance with the present invention, there is provided a torque detection device for detecting a torque applied to a bicycle for controlling power output of a motor applied to the bicycle in helping moving the bicycle. The torque detection device comprises a shaft coupled to a driving chain wheel and pedals of the bicycle. A circuit comprising strain gauge based elements is embedded in the shaft for converting a torsional deformation caused by the torque applied to the shaft by a rider via the pedals into an electrical signal. The electrical signal, after being properly processed, is applied to a motor power controller which in turn controls the power output of the motor whereby the torque from the motor is determined based on the torque applied by the rider to the bicycle. Thus, as the rider applies a great torque to the pedals, the motor correspondingly supplies a large output of power to the bicycle for helping moving the bicycle. No additional manual control of the motor is needed.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
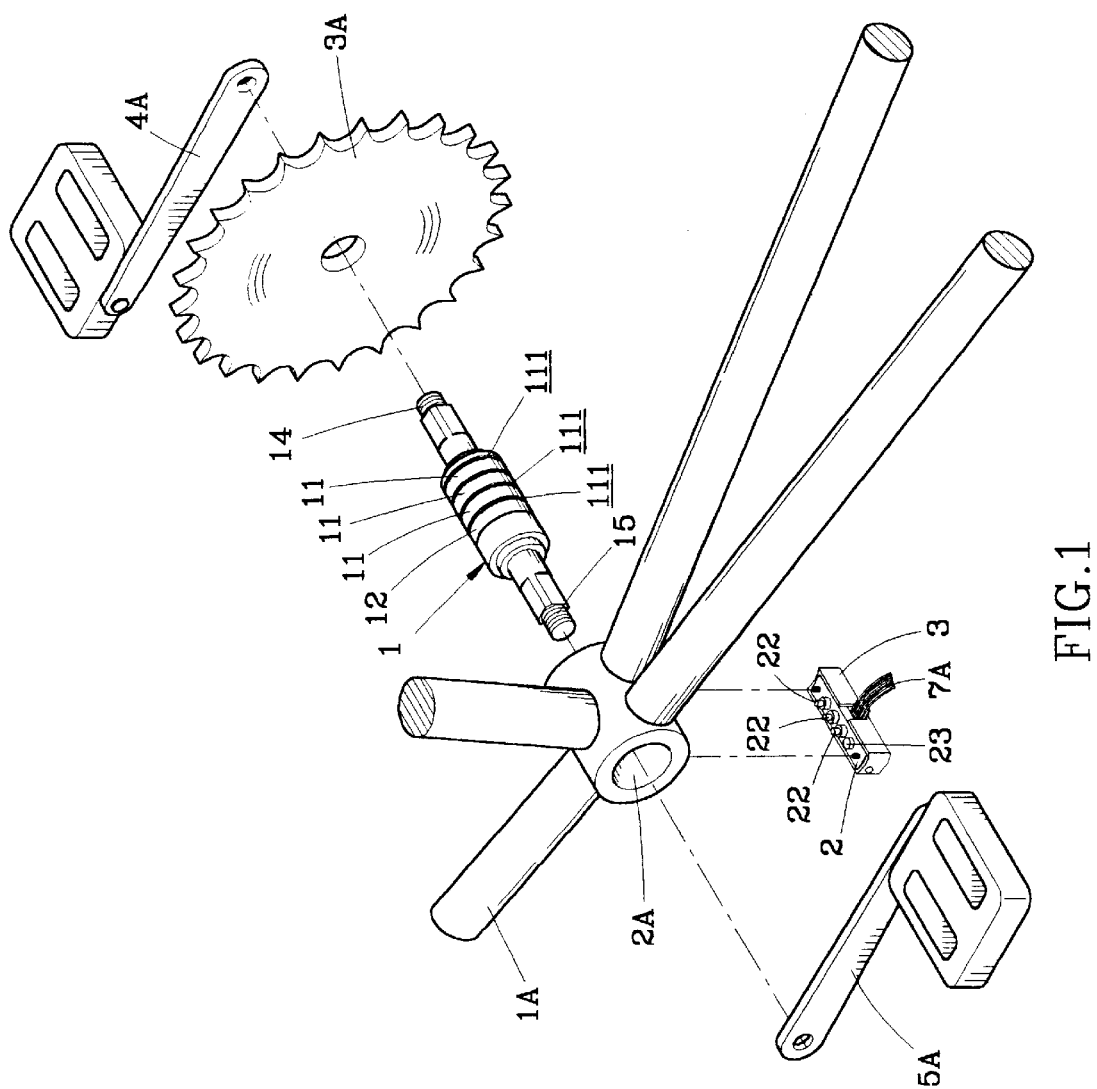
FIG. 1 is an exploded view of a torque detection device constructed in accordance with a first embodiment of the present invention to be mounted to a bicycle frame.
Figure 2:
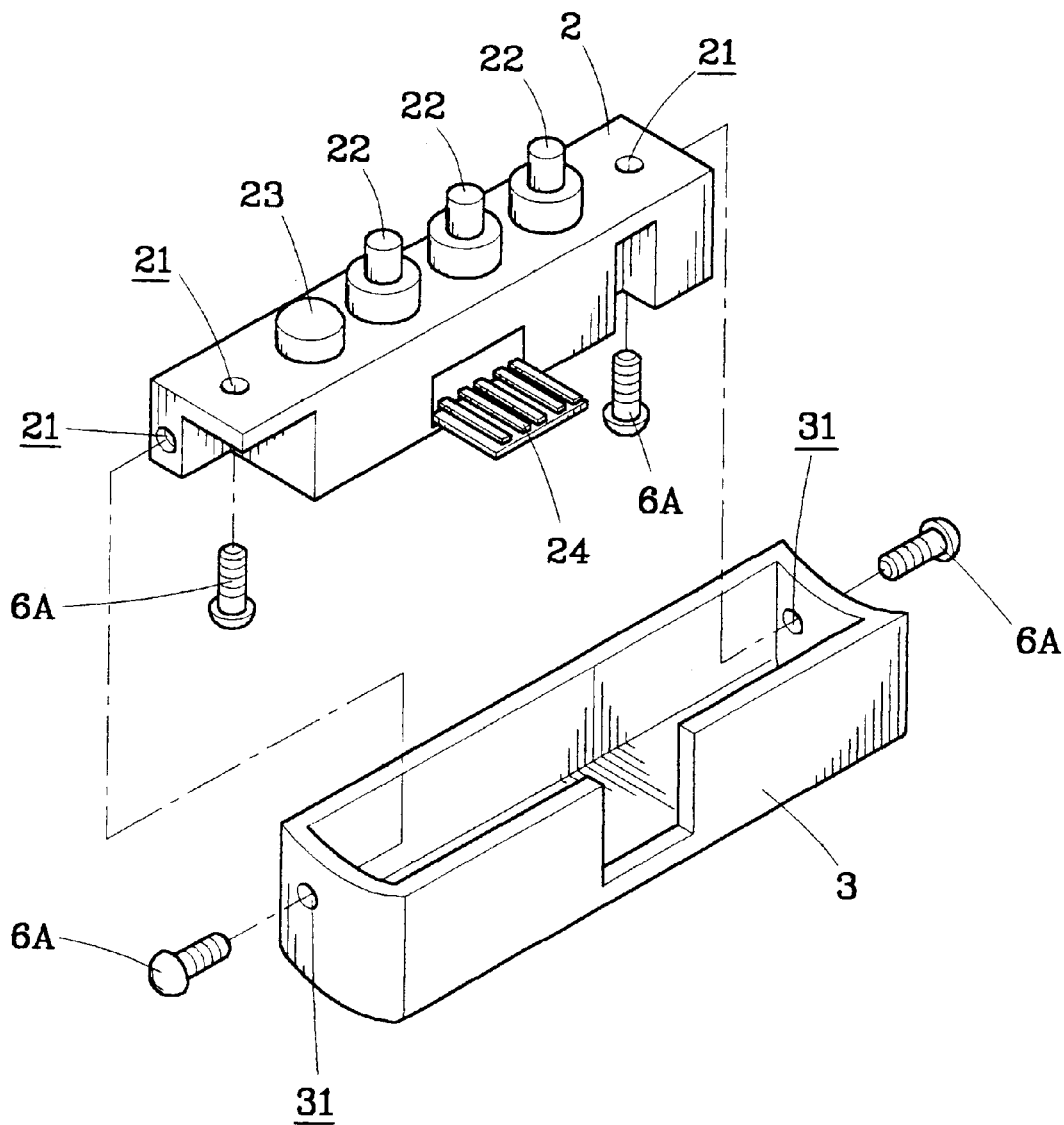
FIG. 2 is an exploded view of a connector of the torque detection device of the present invention.
Figure 3:
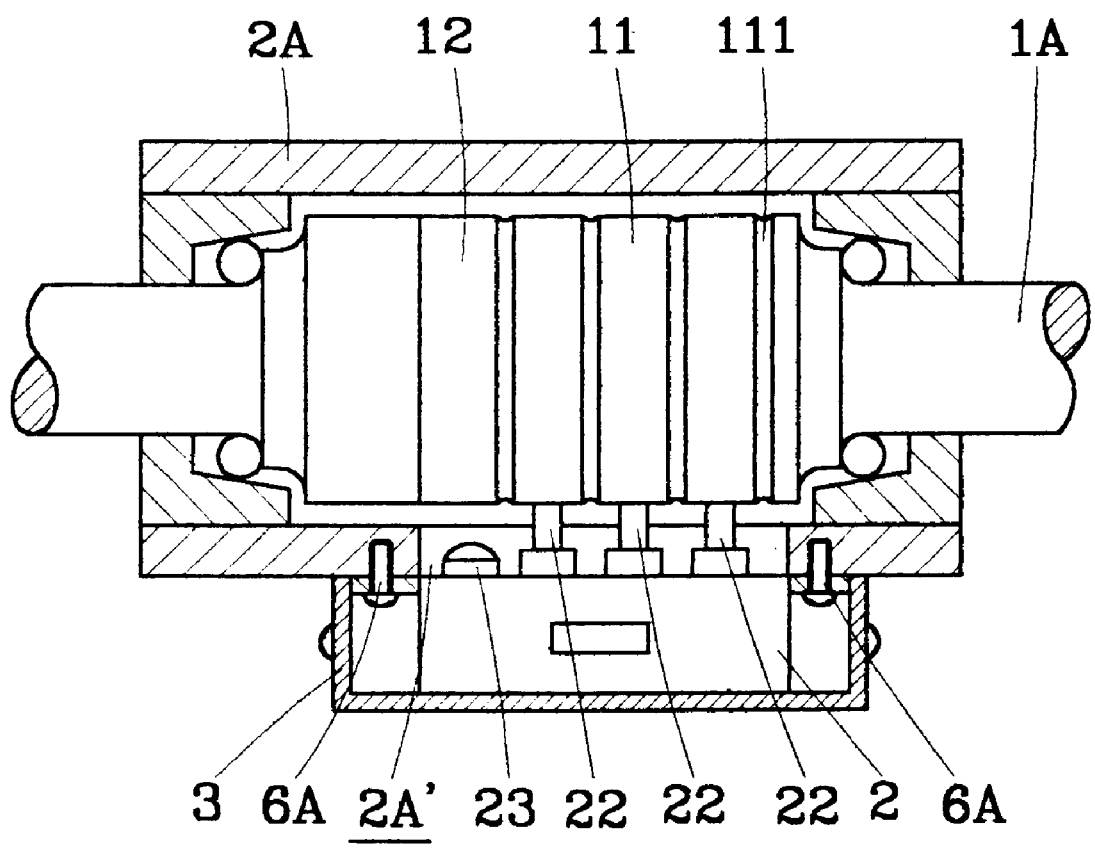
FIG. 3 is cross-sectional view of the torque detection device of the present invention.

With reference to the drawings and in particular to FIGS. 1–3, a torque detection device constructed in accordance with the present invention comprises a torque sensing shaft 1. In a preferred embodiment of the present invention, the torque sensing shaft 1 comprises means, such as strain gauges, that generates an electrical signal corresponding to torsional deformation of the shaft 1 for detecting torque applying thereto. The shaft 1 serves as a pedal axle of a bicycle A (see FIG. 9) rotatably received in a five-branch tube 2A of a frame 1A of the bicycle A. A plurality of conductive rings 11 is mounted around the shaft 1 and spaced from each other by insulative rings 111 to serve as electrical contacts. A direction sensing element 12 is also mounted on the shaft 1. The direction sensing element 12 may comprise a magnet element or an infrared sensor embedded in the shaft 1. Signal amplification means 13 (see FIG. 4) is mounted in the shaft 1 and comprises a circuit connected to the contacts 11 for generating the electrical signal representing the torque applied to the shaft 1. The signal is output through the corresponding contact 11.

The torque sensing shaft 1 has two ends 14, 15 coupled to a driving chain wheel 3A and pedals 4A, 5A of the bicycle A. A rider drives the pedals 4A, 5A to move the bicycle A causing a torque to act on the shaft 1. The torque is detected and a corresponding signal generated by the torque detection device of the present invention.

Figure 9:
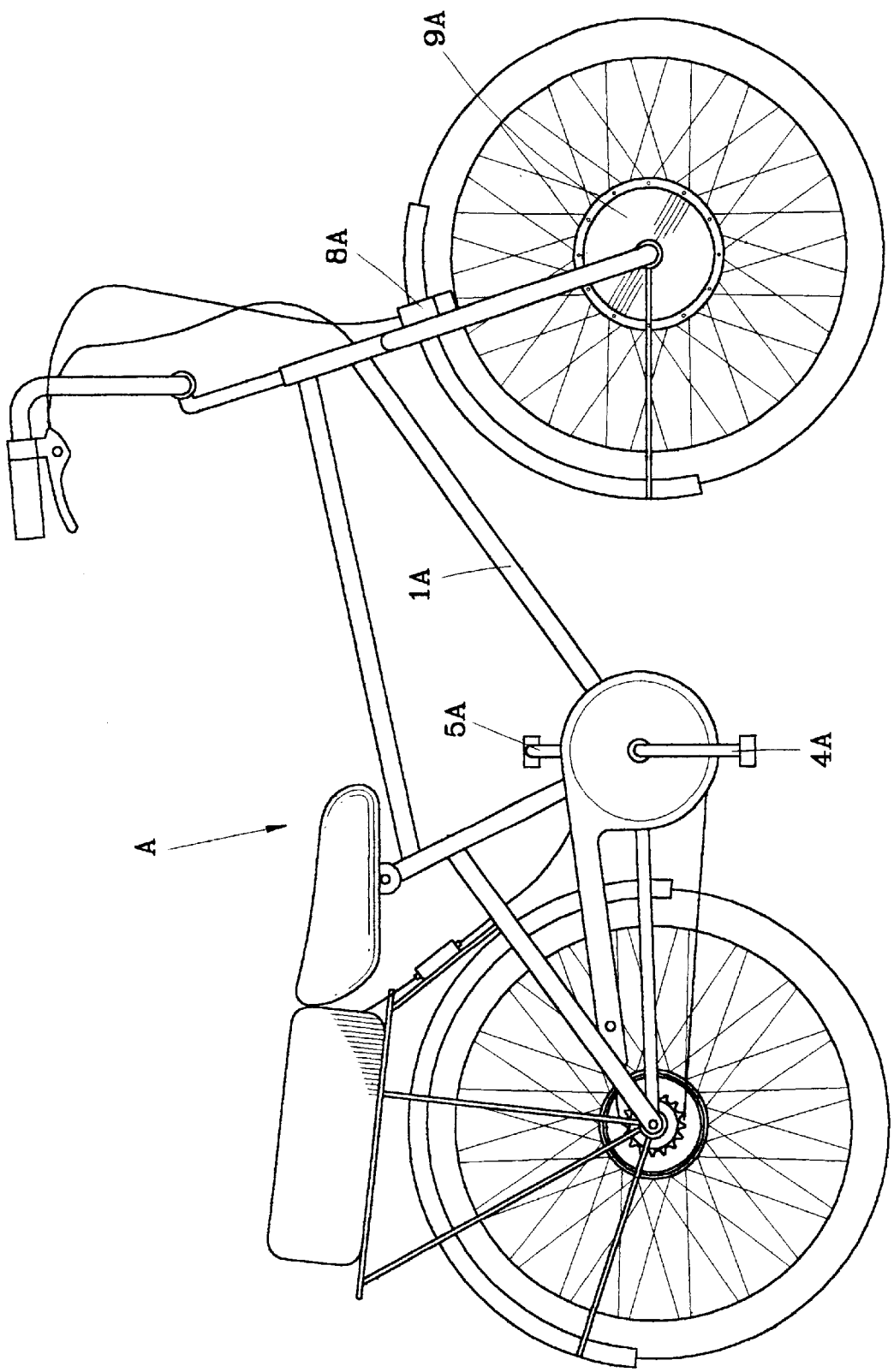
FIG. 9 is a side elevational view of a bicycle to which the torque detection device of the present invention is mounted.

A connector 2 defines a plurality of holes 21 for receiving bolts 6A that fixes the connector 2 in a cavity 2A' defined in an underside of the five-branch tube 2A, as shown in FIG. 3. The connector 2 comprises a plurality of contact bars 22 and a direction detecting member 23 respectively corresponding to the contacts 11 and the direction sensing element 12 of the shaft 1. The contact bars 22 are resiliently supported and extend beyond the cavity 2A' for engaging with the corresponding contacts 11 of the shaft 1 to transmit signal and power therebetween. The signal generated in the signal amplification means 13 is transmitted to a motor power controller 8A of the bicycle A via the corresponding contact bar 11 and a cable assembly 7A connected to output terminnals 24 of the signal detector 2 for controlling the output of the motor 9A (FIG. 9).

The direction detecting member 23 may comprise a Hall IC or reed switch (corresponding to the magnet element of the direction sensing element 12) or an infrared transmitter (corresponding to the infrared sensor of the direction sensing element 12) for cooperating with the direction sensing element 12 of the shaft 1 to detect the rotation direction thereof. Different direction signals will be generated corresponding to clockwise and counterclockwise rotations of the shaft 1. The direction signal is sent through the output terminals 24 to the motor power controller 8A.

The connector 2 is housed in an insulative casing 3. A plurality of holes 31 is defined in the casing 3 corresponding to the holes 21 of the connector 2 for receiving the bolts 6A.

Figure 4:
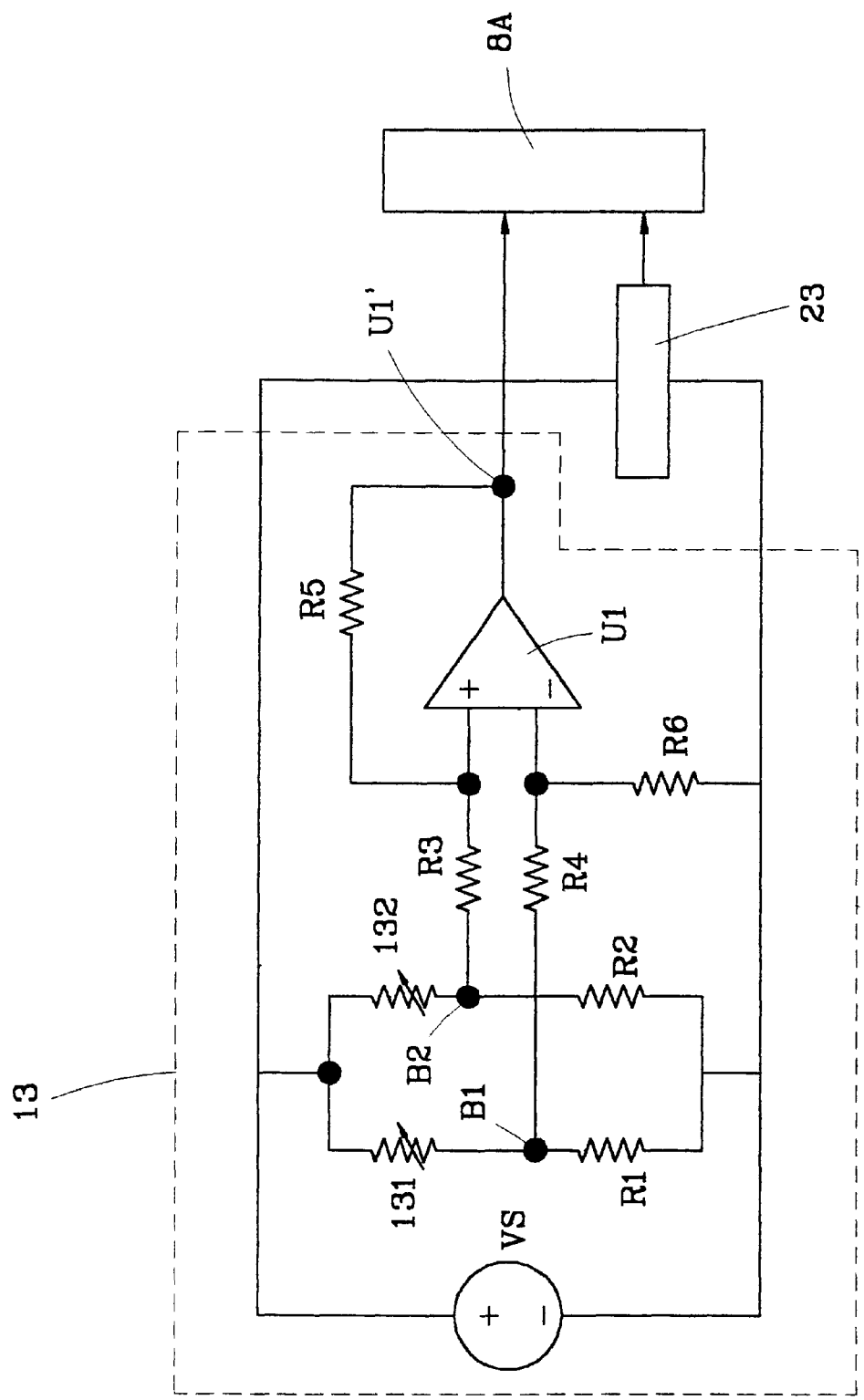
FIG. 4 is circuit diagram of a signal amplification circuit of the torque detection device of the present invention.
Figure 5:
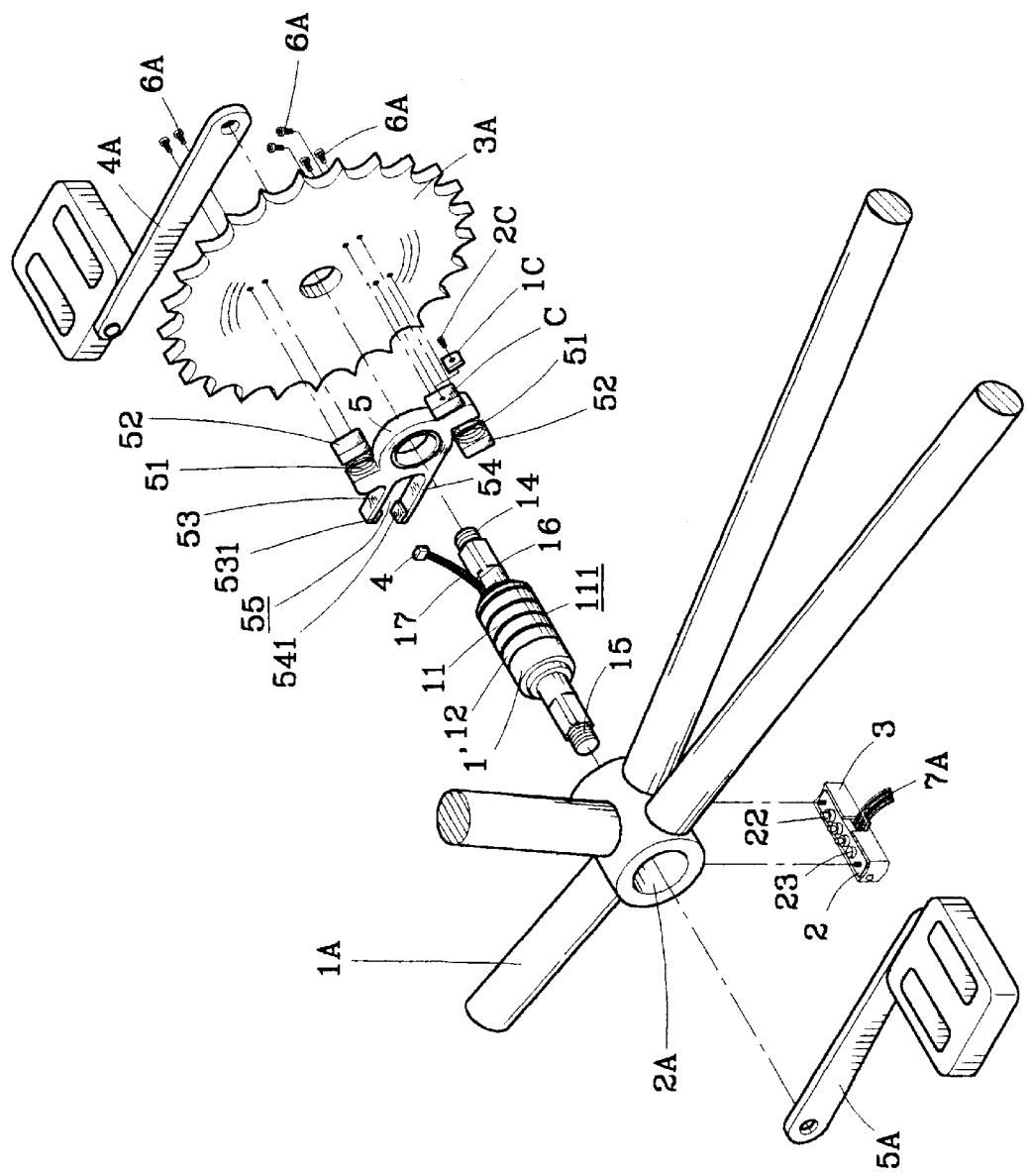
FIG. 5 is an exploded view of a torque detection device constructed in accordance with a second embodiment of the present invention to be mounted to a bicycle frame.
Figure 6:
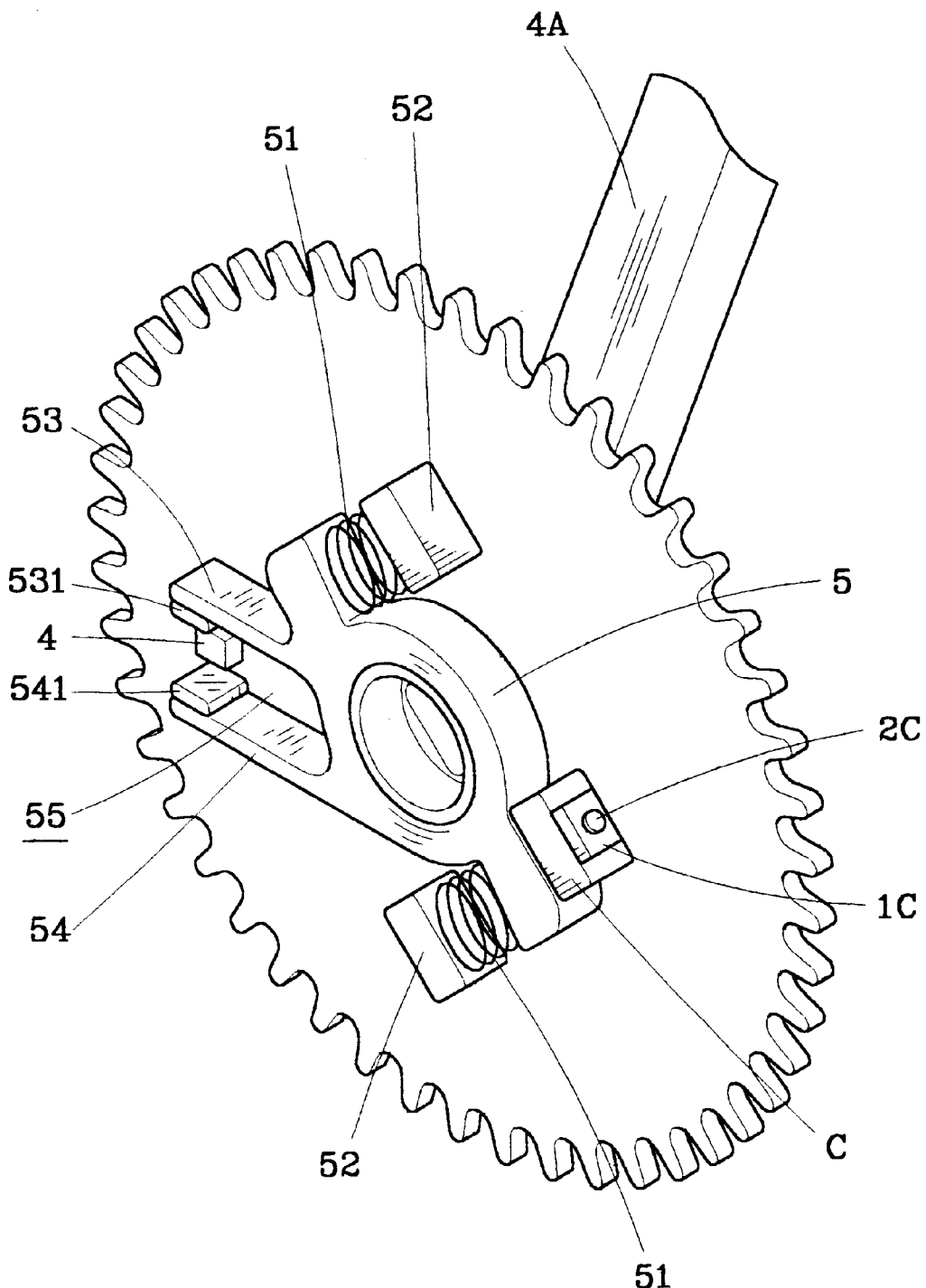
FIG. 6 is a perspective view of a torque detector of the torque detection device of FIG. 5 mounted to a driving chain wheel of the bicycle.
Figure 7:
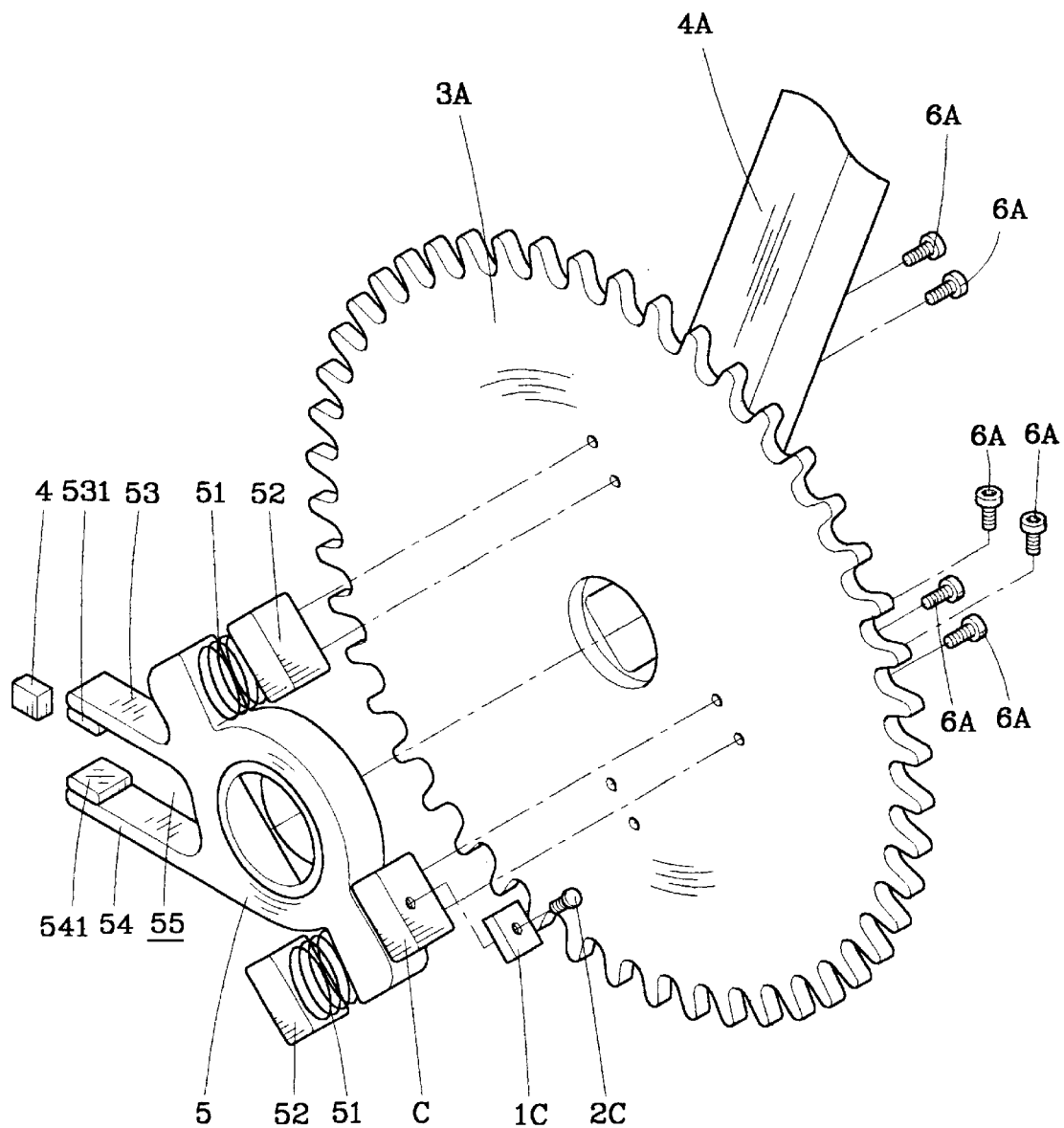
FIG. 7 is an exploded view of FIG. 6.
Figure 8:
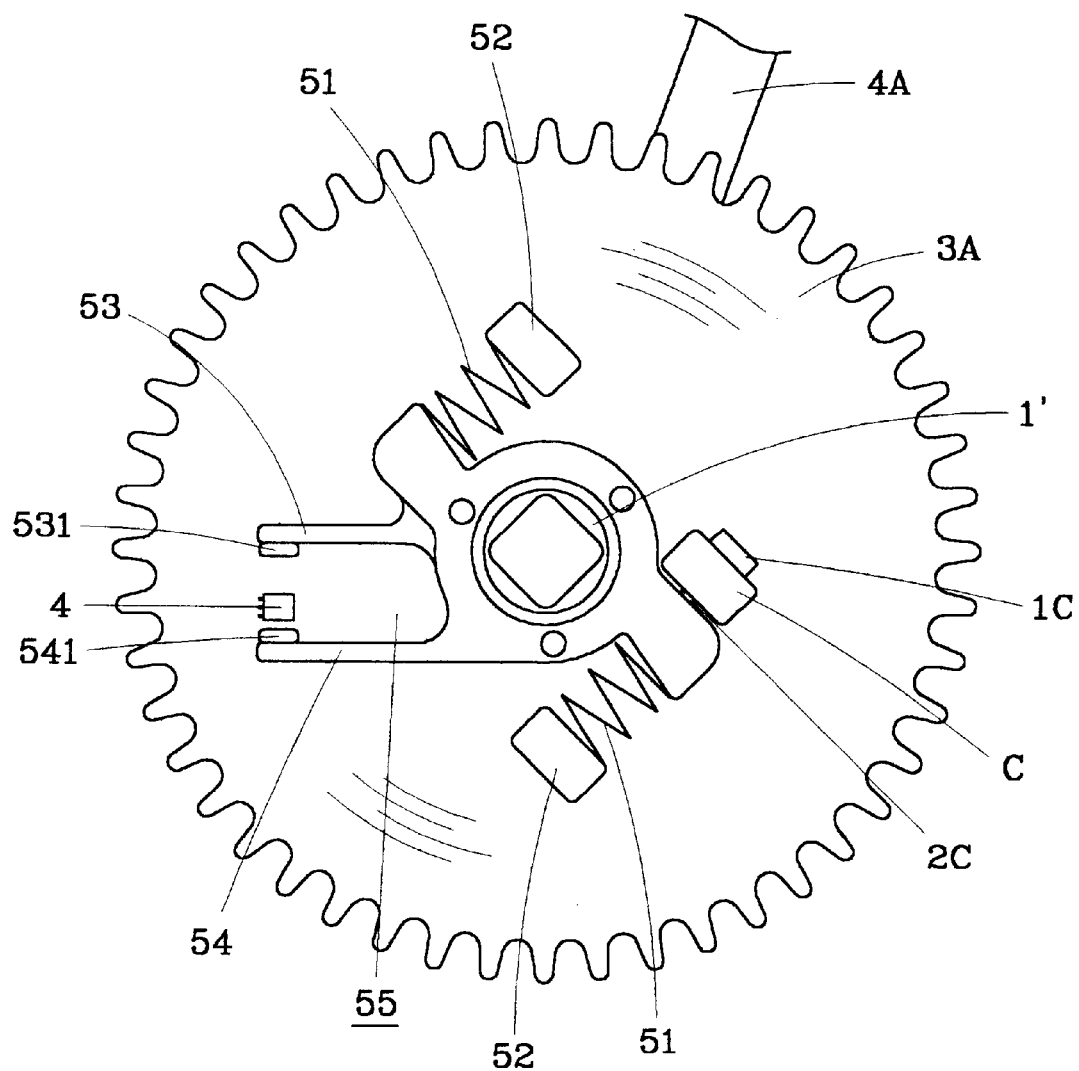
FIG. 8 is a front view of FIG. 6.

With reference to FIG. 4 which shows a circuit diagram of the signal amplification means 13, the signal amplification means 13 is powered by a power source VS which is constituted by electrical power supplied from the motor power controller 8A via the contacts 11. In other words, at least two of the contacts 11 are used as the power input contacts of the signal amplification means 13. The signal amplification means 13 comprises two variable resistors 131, 132 which may be in the form of thin plates made of a material that changes electrical properties thereof, such as resistance, when elongated or deformed whereby the resistance thereof varies with the torque applied to the shaft 1. An example is strain gauge.

The variable resistors 131, 132 form an electrical bridge with two fixed resistors R1, R2. Electrical potential at intermediate points B1, B2 between the variable resistors 131, 132 and the corresponding fixed resistors RI, R2 is taken as the output signal. The output signal is amplified by a differential amplification circuit comprising an operational amplifier U1 and corresponding resistors R3, R4, R5, R6. The amplified output signal taken at output U1' of the differential amplification circuit represents the magnitude of torque applied to the shaft 1 by the rider and the signal is applied to the motor power controller 8A.

The direction detecting member 23 is also included in the circuit diagram of FIG. 4. The direction signal from the direction detecting member 23 is applied to the motor power controller 8A. Therefore, the input of the motor power controller 8A includes, at least, the magnitude of the torque applied to the shaft I and the rotational direction of the shaft 1 and based on such inputs, the motor power controller 8A controls the output of the motor 9A of the bicycle A that is applied to the bicycle for helping moving the bicycle A.

With reference to FIGS. 5–8 which show a second embodiment of the torque detection device of the present invention, the second embodiment comprises a torque sensing shaft 1' that is different from the torque sensing shaft 1 of the first embodiment. The torque sensing shaft 1' comprises no strain gauge and instead, a torque detector 5 is used to detect the torque applied to the bicycle A by the rider. The signal amplification means 13 that is for amplification of the signal from the strain gauge is thus eliminated. However, the contact rings 11, the insulative rings 111 separating the contact rings 11 and the direction sensing element 12 are retained on the shaft 1'. A slot 16 is defined in surface of the shaft 1' for receiving and retaining a wire 17 therein. The wire 17 has a first end connected to the corresponding contact 11 of the torque sensing shaft 1' and a second end connected to a sensing device 4 for transmitting the electrical signal from the sensing device 4 to the contact 11. The signal is then transmitted to the connector 2 via the engagement between the contact 11 and the corresponding contact bar 22 of the connector 2.

A torque detector 5 is fixed to the driving chain wheel 3A by bolts 6A. The torque detector 5 comprises two resiliently deformable elements 51 supported thereon. The resiliently deformable elements 51 are located at opposite positions with respect to a center of the driving chain wheel 3A. In other words, the resiliently deformable elements 51 are spaced 180 degrees from each other. There can be more than two such resiliently deformable elements 51 and preferably, the resiliently deformable elements 51 are symmetrically arranged with respect to the center of the driving chain wheel 3A. The resiliently deformable elements 51 may comprise springs, such as torsional springs or compression springs. Each element 51 is fixed to a mounting block 52 that is fixed to the driving chain wheel 3A whereby a spring force acts upon the pedals 4A, 5A when the pedals 4A, 5A are driven by the rider and the elements 51 deform. The deformation of the elements 51 is substantially proportional to the torque applied to the torque sensing shaft 1'.

The torque detector 5 comprises a pair of arms 53, 54 which are opposite to and spaced from each other for defining a space 55 in which the sensing device 4 is arranged. A reference member 531, 541 is attached to a free end of each arm 53, 54. The distance between each reference member 531, 541 and the sensing device 4 varies corresponding to the deformation of the resiliently deformable elements 51 whereby by sensing the variation of distances between the reference members 531, 541 and the sensing device 4, the detonation of the elements 51 may be determined which in turn determines the torque applied to the shaft 1'. In the embodiment illustrated, the reference members 531, 541 comprise magnet elements which magnetically interacts with the sensing device 4 for inducing voltage signal in the sensing device 4. The sensing device 4 may be comprised of Hall IC for interaction with the magnets of the reference numbers 531, 541 to induce the voltage signal. This signal is applied to the wire 17 and is transmitted to the motor power controller 8A via the connector 2.

When the rider applies a large torque to the shaft 1' by forcibly depressing the pedals 4A, 5A, for example in the situation of riding uphill, the variation of distance between the reference members 531, 541 and the sensing device 4 is increased and the sensing device 4 outputs a high voltage signal via the corresponding contact 11 of the connector 2. The high voltage signal is applied to the motor power controller 8A and causes a great power output of the motor 9A for facilitating moving the bicycle A uphill.

On the contrary, when the bicycle A is moving downhill or moving on a horizontal surface, the torque applied to the shaft 1' is small or approaches zero whereby the variation of distance between the reference members 531, 541 and the sensing device 4 is little or even zero and the sensing device 4 outputs a lower voltage signal via the corresponding contact 11 of the connector 2 or even does not output any signal. The lower voltage signal is applied to the motor power controller 8A and causes only a small power output of the motor 9A.

The direction sensing element 12 and the direction detecting member 23 determine the rotational direction of the chain wheel of the bicycle A for facilitating the control and safety of use of the motor 9A.

An adjustment block C is attached to the torque detector 5 by a bolt 2C, preferably with a washer 1C interposed therebetween. By adjusting the bolt 2C, the resiliently deformable elements 51 may be pre-loaded to different extents thereby adjusting the output signal of the torque detector 5.

With reference to FIG. 9, wherein a bicycle A is shown to which the torque detection device in accordance with the present invention is mounted, the torque detection device is mechanically coupled to the pedal axle that comprises the torque sensing shaft 1, 1' whereby the forces that a rider applies to pedals 4A, 5A for riding the bicycle A are transmitted to the torque detection device and detected thereby. An electrical signal representing the magnitude of the torque is generated and transmitted to the motor power controller 8A via the connector 2 whereby the motor power controller 8A controls the power output of the motor 9A in accordance with the actual requirement of torque. An effective control of the power from the motor 9A applied to the bicycle A may thus be obtained.

Although the present invention has been described with respect to the preferred embodiments, it is contemplated that a variety of modifications, variations and substitutions may be done without departing from the scope of the present invention that is intended to be defined by the appended claims.

What is claimed is:

1. A torque detection device comprising:
    a shaft adapted to be rotatably supported by a frame of a bicycle having a motor for applying power to the bicycle for facilitating riding the bicycle, the shaft having two ends adapted to be mechanically coupled to pedals of the bicycle whereby torque applied to the pedals by a rider acts upon and torsionally deforms the shaft, signal generation means being incorporated in the shaft for converting the torsional deformation of the shaft into a first electrical signal; and
    a connector adapted to be fixed to the bicycle frame and electrically connected between the signal generation means and a power motor controller for transmitting the first signal to the power motor controller which in turn controls the power output of the motor.

2. The torque detection device as claimed in claim 1, wherein a plurality of first ring contacts are mounted around the shaft, the connector comprising second contacts corresponding to and engaging with the first contacts for electrical connection therebetween.

3. The torque detection device as claimed in claim 2, wherein each second contact comprises a bar resiliently supported and biased to engage with the corresponding first contact of the shaft.

4. The torque detection device as claimed in claim 2, wherein the first contacts are spaced by insulative rings mounted on the shaft.

5. The torque detection device as claimed in claim 1, wherein a direction sensing element is mounted on the shaft and a corresponding direction detecting member is mounted in the connector for cooperating with the direction sensing element to determine rotational direction of the shaft.

6. The torque detection device as claimed in claim 5, wherein the direction sensing element comprises a magnet and wherein the direction detecting member comprises a Hall IC or a reed switch.

7. The torque detection device as claimed in claim 5, wherein the direction sensing element comprises an infrared sensor and the direction detecting member comprises an infra-red transmitter.

8. The torque detection device as claimed in claim 1, wherein said signal generation means comprises means mounted to the shaft and having an electrical resistance variable with the torsional deformation of the shaft for generation of a second electrical signal corresponding to the torsional deformation of the shaft.

9. The torque detection device as claimed in claim 8, wherein the means having an electrical resistance variable with the torsional deformation of the shaft comprises two variable resistors and wherein the signal generation means comprises an electrical bridge comprising the two variable resistors and two fixed resistors for generating a third electrical signal corresponding to the torsional deformation of the shaft.

10. The torque detection device as claimed in claim 8, wherein the signal generation means comprises a differential amplification circuit for amplifying and converting the second signal into the first signal.

11. The torque detection device as claimed in claim 9, wherein the signal generation means comprises a differential amplification circuit for amplifying and converting the third signal into the first electrical signal.

12. The torque detection device as claimed in claim 1, wherein the signal generation means comprises (a) a torque detector coupled to the shaft for being driven by the petals, (b) at least one resiliently deformable element adapted to be mounted between the torque detector and a chain wheel of the bicycle, whereby when a torque is applied to the chain wheel via the pedals, the resiliently deformable element is deformed, and (c) means for inducing the first electrical signal.

13. The torque detection device as claimed in claim 12, wherein the torque detector comprises two resiliently deformable elements arranged 180 degrees spaced from each other about the shaft.

14. The torque detection device as claimed in claim 12, wherein the means for inducing the first electrical signal comprises a sensing device adapted to be mounted to the chain wheel of the bicycle and at least one reference member mounted to an arm extending from the torque detector with a predetermined distance existing between the sensing device and the reference member, the distance being varied corresponding to the deformation of the resiliently deformable element for inducing the first electrical signal.

15. The torque detection device as claimed in claim 14, wherein the sensing device comprises a Hall IC and the reference member comprises a magnet cooperating with each other to induce the first electrical signal in the sensing device.

16. The torque detection device as claimed in claim 14, wherein the torque detector has two arms extending therefrom, free ends of the arms being opposite to and spaced from each other to define a space therebetween for receiving the sensing device, a reference member being attached to the free end of each arm with a predetermined distance existing between the sensing device and each reference member, the distances being varied corresponding to the deformation of the resiliently deformable element for inducing the first electrical signal.

17. The torque detection device as claimed in claim 12, wherein the resiliently deformable element comprises spring.

18. The torque detection device as claimed in claim 12, wherein adjusting means is adapted to be mounted to the chain wheel of the bicycle for applying and adjusting a pre-load to the resiliently deformable element thereby adjusting the deformation of the resiliently deformable element.

* * * * *